(12) United States Patent
Rathod et al.

(10) Patent No.: US 11,560,190 B2
(45) Date of Patent: Jan. 24, 2023

(54) TRACK CHAIN COMPONENTS WITH HARDFACE OVERLAY

(71) Applicant: Caterpillar Inc., Peoria, IL (US)

(72) Inventors: Chandrasen Rameshlal Rathod, Peoria, IL (US); Roger Lee Recker, Dunlap, IL (US); Robert Jason Pickerill, Peoria, IL (US); Scott E. Keele, Germantown Hills, IL (US); Douglas Trent Weaver, Brimfield, IL (US); Daniel Joseph Sordelet, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 643 days.

(21) Appl. No.: 16/591,250

(22) Filed: Oct. 2, 2019

(65) Prior Publication Data
US 2021/0101651 A1 Apr. 8, 2021

(51) Int. Cl.
*B23K 26/342* (2014.01)
*B23K 9/04* (2006.01)
*B62D 55/21* (2006.01)
*F16C 33/14* (2006.01)

(52) U.S. Cl.
CPC .............. *B62D 55/21* (2013.01); *B23K 9/04* (2013.01); *B23K 26/342* (2015.10); *F16C 33/14* (2013.01)

(58) Field of Classification Search
CPC ...................................................... B62D 55/21
See application file for complete search history.

(56) References Cited

U.S. PATENT DOCUMENTS

| 3,227,586 | A | 1/1966 | Spencer |
| 4,097,711 | A * | 6/1978 | Banerjee ............ B23K 35/327 219/76.1 |
| 6,074,022 | A | 6/2000 | Anderton |
| 6,145,941 | A | 11/2000 | Anderton et al. |
| 6,414,258 | B1 * | 7/2002 | Amano ............... B62D 55/125 219/76.14 |
| 6,948,784 | B2 | 9/2005 | Wodrich et al. |
| 7,657,990 | B2 | 2/2010 | Wodrich et al. |
| 2004/0164614 | A1 | 8/2004 | Takayama et al. |
| 2006/0017323 | A1 * | 1/2006 | Wodrich ............... B62D 55/32 305/202 |

(Continued)

FOREIGN PATENT DOCUMENTS

| JP | 2007084917 | 4/2007 |
| WO | 2020050998 | 3/2020 |

*Primary Examiner* — Jacob J Cigna
(74) *Attorney, Agent, or Firm* — Lee & Hayes, P.C.

(57) ABSTRACT

A steel track chain component, such as a track bushing, may be formed with a carburized portion, a hardface portion, and a core portion. The core portion may be softer than the carburized portion, which in turn, may be softer than the hardface portion. This configuration of the various portions of the component may allow for relatively high wear resistance of the component, as well as toughness. The core portion may be mostly ferrite crystal structure, while the carburized portion and the hardface portions may include martensitic and/or austenitic crystal structure. The carburized portion may be formed by carburizing the track chain component in a heated and carbon rich environment. The hardface portion may be formed by welding a hardface alloy over at least a portion of the carburized portion.

20 Claims, 6 Drawing Sheets

(56) References Cited

U.S. PATENT DOCUMENTS

| | | |
|---|---|---|
| 2006/0163217 A1 | 7/2006 | Jiang et al. |
| 2006/0181151 A1 | 8/2006 | Wodrich et al. |
| 2008/0284245 A1* | 11/2008 | Livesay ................ B62D 55/26 |
| | | 305/201 |
| 2010/0139993 A1* | 6/2010 | Sebright ................ B62D 55/21 |
| | | 180/6.7 |
| 2018/0320244 A1 | 11/2018 | Rathod et al. |
| 2020/0070908 A1* | 3/2020 | Johannsen ............. B62D 55/20 |

* cited by examiner

TRACK CHAIN COMPONENTS WITH HARDFACE OVERLAY

TECHNICAL FIELD

The present disclosure relates to track chain components with hardface overlays. More specifically, the present disclosure relates to track chain components with hardfaces to achieve improved wear life.

BACKGROUND

Track-type machines are in widespread use in construction, mining, forestry, and other similar industries. The undercarriage of such track-type machines utilizes track assemblies, rather than wheels, to provide ground-engaging propulsion. Such track assemblies may be preferred in environments where creating sufficient traction is problematic, such as those frequently found in the industries identified above. Specifically, rather than rolling across a work surface on wheels, track-type machines utilize one or more track assemblies that include an endless loop of coupled track links defining outer surfaces, which support ground-engaging track shoes, and inner surfaces that travel about one or more rotatable track-engaging elements, such as, drive sprockets, idlers, tensioners, and rollers, for example.

Typical track chain assembly designs include a track pin either fixedly or rotatably connected to a pair of chain links and a bushing rotatably positioned between the links and about the track pin. Such track chain assemblies can operate in extremely adverse environments in which track joints may be exposed to various abrasive mixtures of water, dirt, sand, rock or other mineral or chemical elements. The bearing interface between the track pin and the bushing can encounter high contact stresses which lead to galling failure. Galling is a principal failure mode for track chain assemblies and can limit the life of track chain assemblies in many applications. Additionally, operation of track chain assemblies can wear out the components of the track chain, such as the bushings, sprockets, idlers, etc.

During operation, the track bushing and/or other components of the track chain assembly may experience excessive loading. Different surfaces of the track bushing, for example, an inner diameter, end ring surfaces, and so on may require abrasion resistance with increased strength and toughness to endure loads that may be imposed on the track bushing. Similarly, other components of the track chain may also be prone to high levels of abrasion and made to endure high loads. As a result, components of track chain assembly may be manufactured to have hard outer portions to reduce the amount of wear during use. However, the production of these track components may be a time consuming, laborious, and costly process. Furthermore, the final components, such as the bushings, may fail to provide sufficient wear resistance and toughness when produced by traditional methods.

An example of producing track chain components is described in U.S. Pat. No. 7,657,990 (hereinafter referred to as the '990 reference), where material is plasma transfer arc (PTA) welded on a surface or into an undercut or channel of an iron-based alloy. For example, a hard metal alloy slurry is disposed on a surface or into an undercut or channel and then fused to form a metallurgical bond with the iron-based alloy. However, this requires additional processing steps, such as undercutting and then application of metal alloy slurry. Specifically, in '990, the carburized metal is removed prior to surface welding. Thus, the process of slurry application and fusing, as described in the '990 reference, is not performed on a hardened and/or carburized layer of steel. This may limit the thickness of the outer layer.

Example embodiments of the present disclosure are directed toward overcoming the deficiencies described above.

SUMMARY

In an example embodiment of the present disclosure, a method for manufacturing a component of a track chain assembly includes carburizing a rough component to form a carburized portion of the track chain component. The rough component is formed from low carbon steel with a carbon content less than 0.4% by weight. Furthermore, the low carbon steel has a substantially ferrite crystal structure. The method further includes depositing a hardface alloy over at least a part of the carburized portion to form a hardface portion of the track chain component.

In another example embodiment of the present disclosure, a bushing includes an outer surface and an inner surface opposing the outer surface, the inner surface defining a channel having a substantially constant diameter, the channel extending substantially centrally through the bushing from a first end of the bushing to a second end of the bushing opposite the first end. The bushing further has an inner portion including the inner surface, an outer portion including the outer surface, a hardface portion at least partially overlying the outer surface, and a core portion disposed between the inner portion and the outer portion. In this bushing, the core portion is softer than the inner portion and the core portion is softer than the outer portion. Furthermore, the core portion is softer than the hardface portion.

In yet another example embodiment of the present disclosure, a track chain assembly comprises a plurality of components including a plurality of track shoes, a plurality of links, and a plurality of bushings. At least one of the components includes a core portion, a carburized portion overlying the core portion, and a hardface portion overlying the carburized portion. The core portion is softer than the carburized portion and the core portion is softer than the hardface portion. Furthermore, a combination of the carburized portion and the hardface portion is at least 4 mm in thickness.

DETAILED DESCRIPTION

Wherever possible, the same reference numbers will be used throughout the drawings to refer to the same or like parts.

Figure 1:
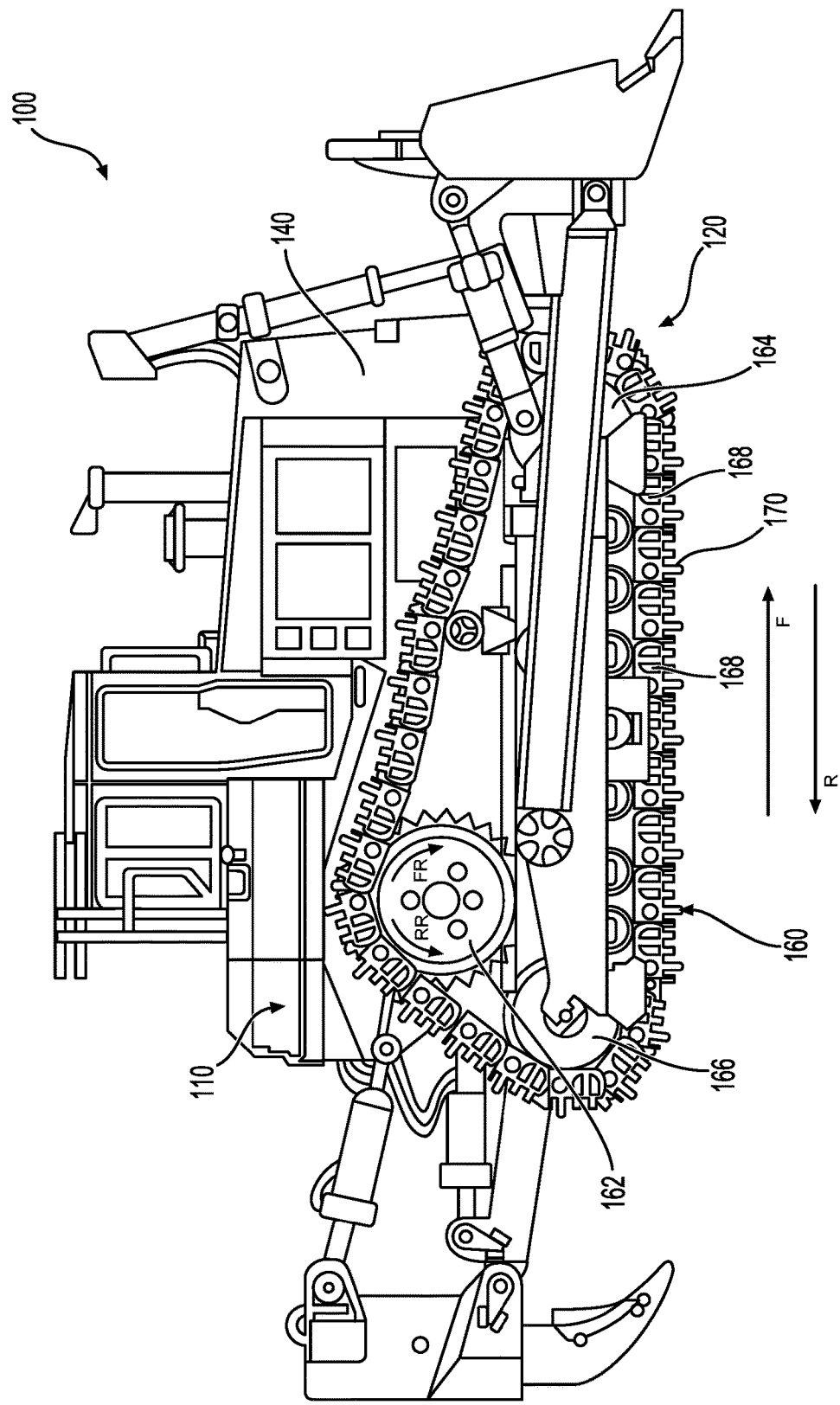
FIG. 1 is a schematic illustration of an example system including a track-type machine with one or more components formed in accordance with example embodiments of the disclosure.

FIG. 1 is a schematic illustration of an example system including a track-type machine 100 with one or more components formed in accordance with example embodiments of the disclosure. The example embodiment of the machine 100 includes a track-type undercarriage 120. The machine 100 may also be referenced herein interchangeably as a "track-type machine" 100 and/or "machine" 100. In other embodiments, the machine 100 may be any suitable machine with a track-type undercarriage 120, such as, a dozer, loader, excavator, tank, backhoe, drilling machine, trencher, or any other on-highway or off-highway vehicle.

The machine 100 includes a frame 140 having a first track chain assembly 160 disposed on a first side 110 thereof, and a second track chain assembly (not shown) disposed on a second side (not shown) thereof. The second side is in opposing relationship to the first side 110. Together, the track assemblies are adapted to engage the ground, or other surface, to propel the machine 100 in a backward and/or forward direction.

It should be appreciated that the track assemblies of the machine 100 may be similar and, further, may represent mirror images of one another. As such, only the first track chain assembly 160 will be described herein. It should be understood that the description of the first track chain assembly 160 may be applicable to the second track chain assembly, as well. Other embodiments, in accordance with the disclosure, may include more than two track chain assemblies. Thus, the apparatus, systems, and methods, as disclosed herein, apply to any suitable track-type machine, or variations thereof. Additionally, the disclosed components of the track-type machine 100 and the mechanism of formation thereof, as discussed herein, may also apply to other systems, such as non-track type machines and/or other mechanical systems.

With continuing reference to FIG. 1, the first track chain assembly 160 extends about a plurality of rolling elements such as a drive sprocket 162, a front idler 164, a rear idler 166, and a plurality of track rollers 168. The track chain assembly 160 includes a plurality of ground-engaging track shoes 170 for engaging the ground, or other surface, and propelling the machine 100.

During typical operation of the undercarriage 120, the drive sprocket 162 is driven, such as by an engine, in a forward rotational direction FR to drive the track chain assembly 160, and thus the machine 100, in a forward direction F, and in a reverse rotational direction RR to drive the track chain assembly 160, and thus the machine 100, in a reverse direction R. The drive sprockets 162 of the undercarriage 120 can be independently operated to turn the machine 100.

The undercarriage 120 and track chain assembly 160 may include a variety of other components, as described herein. Due to the harsh operating environments and the loads put on various components of the track chain assembly 160, it is desirable to improve material properties of the various components of the track chain assembly 160 to improve the usable life of those components.

While the machine 100 is illustrated in the context of a track-type machine, it should be appreciated that the present disclosure is not thereby limited, and that a wide variety of other machines having tracks are also contemplated within the present context. For example, in other embodiments, the track chain assembly 160 can be included in a conveyor system, as a track for transmitting torque between rotating elements, or in any other application known to those skilled in the art. Additionally, machines without tracks may include components, as disclosed herein.

According to example embodiments of the disclosure, various components of the machine 100 and its track chain assembly 160 may be formed in manner that improves their wear resistance, while maintaining and/or improving their overall toughness. The mechanisms as disclosed herein may apply to any variety of the track chain assembly components disclosed herein, to increase the surface hardness of those components, while maintaining a softer core region in those components to provide improved surface wear resistance, reduced galling between parts, and high toughness.

Figure 2:
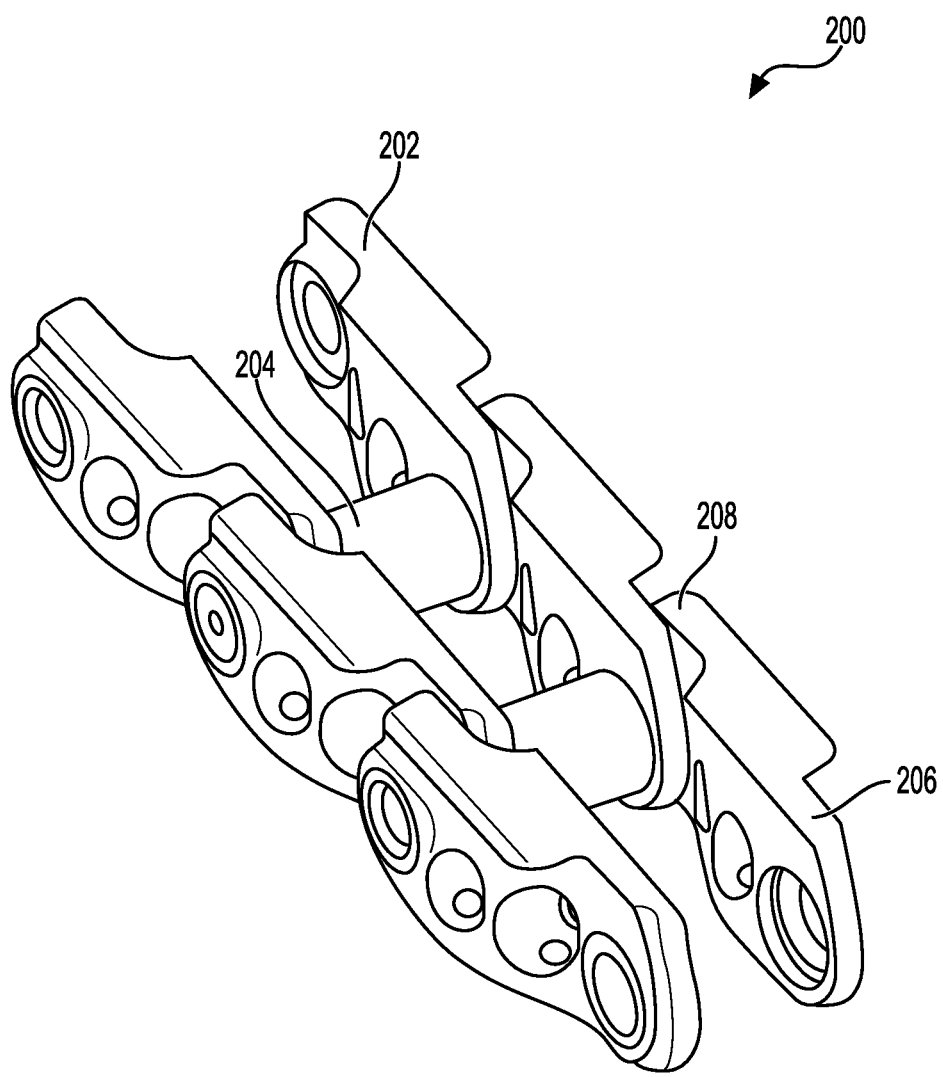
FIG. 2 is a schematic illustration of an example portion of a track chain assembly for an undercarriage of an example track-type machine as depicted in FIG. 1, according to example embodiments of the disclosure.

FIG. 2 is a schematic illustration of an example portion 200 of a track chain assembly 160 for an undercarriage of an example track-type machine 100 as depicted in FIG. 1, according to example embodiments of the disclosure. As discussed above, when operated, a drive sprocket 162 of the track-type machine 100 may rotate the track assembly 160 about one or more idlers or other guiding components, such as the front idler 164, a rear idler 166, and a plurality of track rollers 168, to facilitate movement of the machine 100.

The track assembly 160 may further include a series of links 202 that may be joined to each other by laterally disposed track bushings 204. As shown, the links 202 may be offset links. That is, each of the links 202 may have an inwardly offset end 206 and an outwardly offset end 208. The inwardly offset end 206 of each of the links 202 are joined to the respective outwardly offset end 208 of each of the adjacent links. In addition, the inwardly offset end 206 of each of the links 202 may be joined to the inwardly offset end 206 of the opposing link, and the outwardly offset end 208 of each of the links 202 may be joined to the outwardly offset end 208 of the opposing link by the track bushing 204. It should be understood, however, that links 202 need not be offset links. Rather, in some embodiments, the links 202 may include inner links and outer links. In such embodiments, both ends of each opposing pair of inner links are positioned between ends of opposing outer links, as is known in the art.

In some aspects, at least part of the present disclosure relates to the formation, production, and/or manufacture of components of the track chain assembly 160, such as the track bushing 204, the drive sprocket 162, the front idler 164, the rear idler 166, the track roller 168, the link 202, shoes of the track chain assembly, and/or other components of the machine 100. Additionally, the mechanisms for formation of the components of the track chain assembly 160 may be applied to other components of other machinery and/or other parts of the machine 100.

Figure 3:
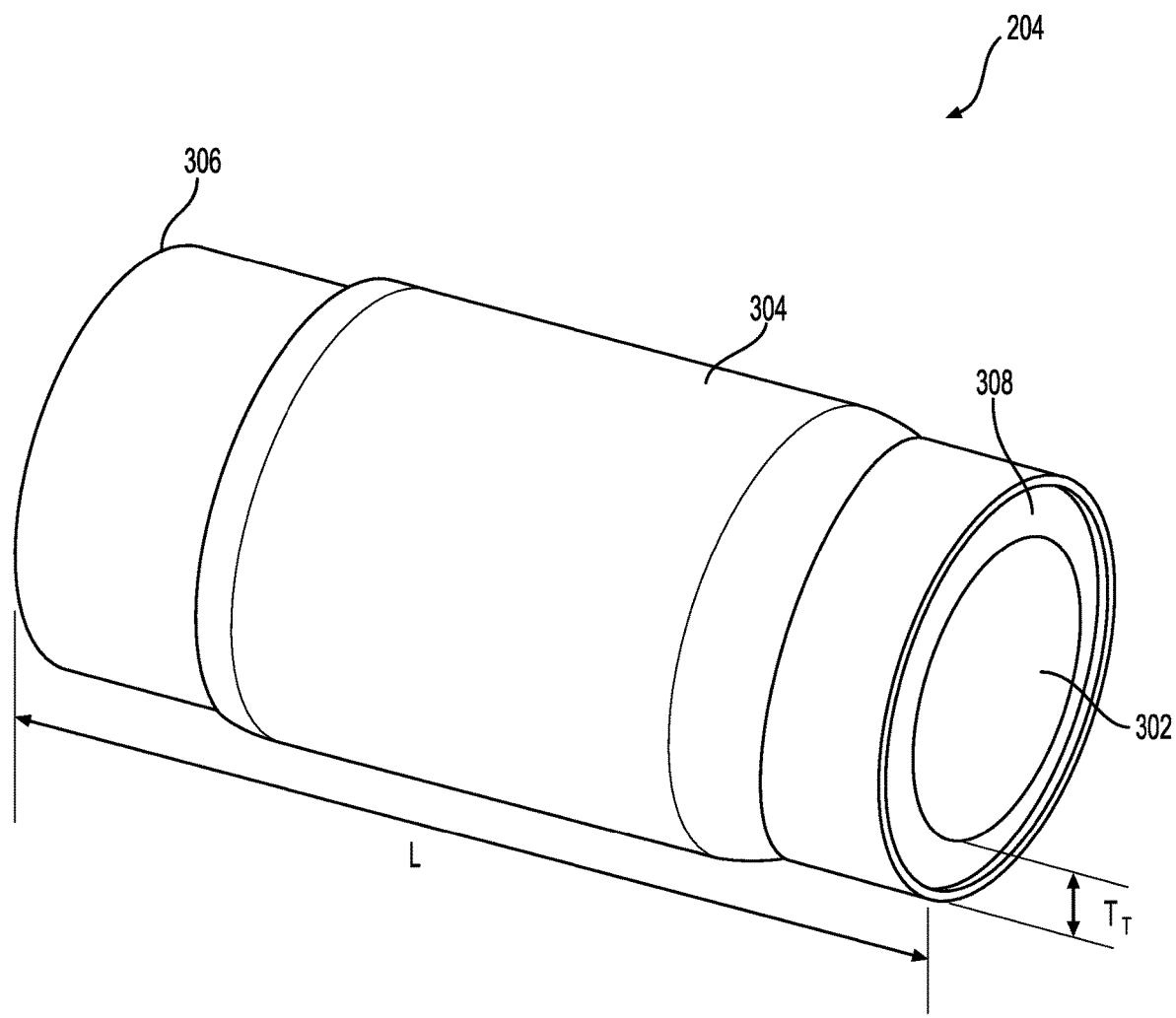
FIG. 3 is a schematic illustration of an example bushing of the portion of the track chain depicted in FIG. 2, according to example embodiments of the disclosure.

FIG. 3 is a schematic illustration of an example bushing 204, according to example embodiments of the disclosure. The track bushing 204 is used as an example of components of the track chain assembly 160 that may be manufactured according to the mechanisms discussed herein. It should be understood that the disclosure herein is not limited to track bushings 204, but instead, the present disclosure is applicable to any suitable components of the track chain assembly 160 and/or any other component of machine 100.

The track bushing 204 may have a generally hollow cylindrical shape including an inner surface 302 and an outer surface 304 defining a thickness "$T_T$" of the track bushing 204 therebetween. As shown, the inner surface 302 and the outer surface 304 may have a curvature to define the round shape of the track bushing 204. The track bushing 204 also has a first end ring 306 and a second end ring 308 defining a length "L" of the track bushing 204.

The shape and dimensions of the track bushing 204 may vary based on the application. For example, larger track chain assemblies 160 may include track bushings 204 of larger size than for smaller sized track chain assemblies 160. The thickness of various portions (e.g., hardened surface layers, softer core portions, etc.) of the track bushing 204 may also vary according to the application of the track bushing 204.

The track bushing 204, according to example embodiments of the disclosure, may be made of low carbon steel, low carbon alloy steel, and/or medium carbon steel with additional processing as disclosed herein. The carbon content of the components, such as the track bushing 204, as formed and prior to any carburizing, hardening, and/or tempering treatments, may be in the range of about 0.05% to about 0.7% by weight. In other example embodiments, the carbon content of the components, such as the track bushings 204, as formed and prior to any carburizing, hardening, and/or tempering treatments, may be in the range of about 0.1% to about 0.3% carbon by weight. For example, the components may be formed from 15B21 steel with a carbon content within the range of about 0.16% and about 0.25% by weight. As another example, boron added steel, such as 10B23, may be used for forming the components with a carbon content in the range of about 0.22% and about 0.28% by weight. In alternative embodiments, the track bushing 204 may be made of higher carbon steel with additional processing as disclosed herein.

The components of the track chain assembly 160, such as track bushing 204, may be formed from steel that may further include other elements therein, such as manganese (Mn), phosphorus (P), sulfur (S), silicon (Si), chromium, and/or other materials. For example, the steel, prior to any carburizing, hardening, and/or tempering treatments, may include between approximately 0.1% and 0.6% Mn by weight, between approximately 0% and 0.1% P by weight, between approximately 0% and 0.1% S by weight, between approximately 0.1% and 0.5% Si by weight, and/or between approximately 0.6% and 3% Cr by weight. Other elements present in the steel may include, but is not limited to, boron (B), cobalt (Co), molybdenum (Mo), nickel (Ni), titanium (Ti), tungsten (W), niobium (Nb), vanadium (V), combinations thereof, or the like.

The track bushing 204 steel, during rough bushing formation, may be any suitable crystal structure, such as ferrite, pearlite, cementite, martensite, and/or austenite. The initial low or medium carbon steel may be relatively soft and ductile, allowing for easier formation of the track bushing 204 or other component. For example, the steel may have an initial hardness in the range of about 40 Rockwell Hardness Scale C (HRC) to about 52 HRC. In example embodiments, if the starting steel is not sufficiently soft, then a tempering process may be performed. In example embodiments, the tempering process may be conducted at an under the carbon-steel eutectic temperature for a multi-hour anneal prior to forming the rough bushing and/or other component. For example, the steel may be held at 200° C. for 3 hours to temper the steel prior to rough forming the track bushing 204. The temperature and/or time ranges here, and throughout the disclosure, are examples, and temperatures and time periods shorter or longer may be used in accordance with example embodiments of the disclosure.

According to example embodiments of the disclosure, the track bushing 204 after rough formation, may be subject to various thermal, removal, and/or deposition treatments, such as forming an undercut, a carburizing process, and/or a hardface process. For example, an undercut may be formed by removing steel from a portion of the rough track bushing, followed by a carburizing process in a carbon rich anneal environment, followed by application of hardface material over the carburized surface of the rough track bushing or other component.

In example embodiments, the amount of steel removed in forming the undercut may be engineered to allow for an intended final thickness ($T_T$) of the track bushing 204 or other component after mass increase due to hardfacing and/or carburizing. The carburizing process may be performed for a time and temperature to allow a sufficient amount of carbon to diffuse into the surface of the steel of the component. For example, with the track busing 204, carburizing may form a zone of relatively high carbon at a depth of about 0.25 mm to about 4 mm on one or both of the inner surface 302 or inner diameter (ID) of the track bushing 204 and/or the outer surface 304 or outer diameter (OD) of the track bushing 204. A hardface may be deposited over a portion of the carburized outer surface 304 of the track bushing 204.

The carburizing process as described herein is a diffusion-limited process. Thus, it is both temporally and/or thermally expensive to form a relatively thick carburized outer layer. Therefore, it may not be desirable, from a processing standpoint, to form relatively thick carburized layers. However, the structures and mechanisms disclosed herein allow for the formation of a relatively thick hardened steel outer layer by the combination of a carburizing process and a hardfacing process. Thus, the relatively thicker outer layer, such as at the outer surface 304 may allow for greater wear resistance of the track bushing 204 or other component relative to what may be achieved by carburizing or hardfacing alone.

While the surfaces of a component are hardened, a softer core region may be disposed away from the surfaces (e.g., inner surface 302 and/or outer surface 304) of the component. In other words, the mechanism, as disclosed herein, may lead to formation of hardened steel at a region near both the outer surface 304 and the inner surface 302 of the track bushing 204, while a core region may be softer and more ductile, leading to improved wear resistance and toughness. Thus, the outer portions, such as a certain depth into the bushing 204 near the inner surface 302 and a certain depth into the bushing near the outer surface 304, as described herein, of the track bushing 204 may be relatively carbon rich and have a mostly martensitic and/or austenitic structure, while the inner portions of the track bushing 204, farther away from the inner surface 302 and the outer surface 304 may have a mostly ferritic cementitic, and/or pearlitic crystal structure.

Figure 4:
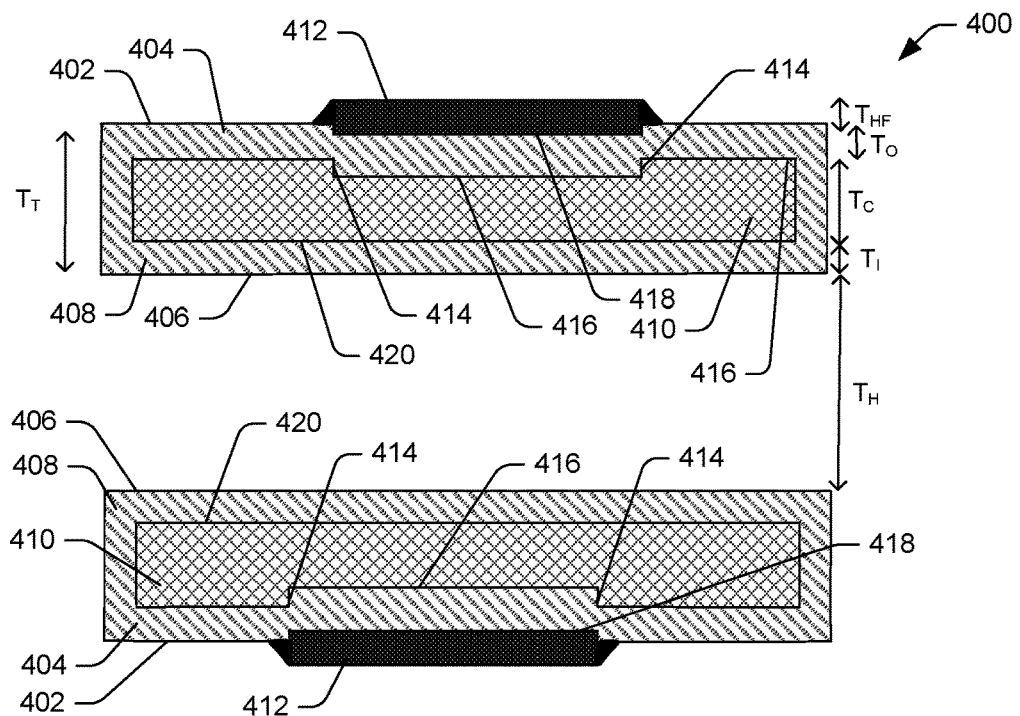
FIG. 4 is sectional illustration of an example bushing, according to example embodiments of the disclosure.

FIG. 4 is sectional illustration of an example bushing 400, according to example embodiments of the disclosure. This example bushing 400 cross section may be an illustrative sectioning through the diameter of the track bushing 204, where the exposed face sections of the sectioning is shown, without showing the curved inner surface 302. As discussed above, the bushing 400, as shown here, may be representative of other components of the track chain assembly 160. In other words, other components, such as the drive sprocket 162, the front idler 164, the rear idler 166, the track roller 168, the link 202, shoes of the trach chain assembly, and/or other components of the machine 100.

As illustrated, the bushing 400 may have a total thickness $T_T$ with a bore hole diameter $T_H$. The bore hole may be a channel having a substantially constant diameter extending substantially centrally through the bushing 400. The bushing 400 may have an outer surface 402, similar to outer surface 304, and an inner surface 406, similar to inner surface 302 of bushing 204. The bushing 400 may have an outer portion 404, with a thickness $T_O$, from interface 416 to the outer surface 402 and/or interface 418, and an inner portion 408, with a thickness $T_I$, from interface 420 to the inner surface 406. Between the inner portion 408 and the outer portion 404 may be disposed a core portion 410, with a thickness $T_C$. The core portion 410 and the outer portion 404 may meet at the interface 416, and the inner surface 406 and the inner portion 408 may meet at the interface 420. The bushing 400 may further include a hardface portion 412 with thickness $T_{HF}$ disposed over the outer portion 404. As shown, the hardface portion 412 may overlie the outer portion 404 over a segment of the outer portion 404. The hardface portion 412 may be in contact with the outer portion 404 at interface 418.

Although the interfaces 416, 418, 420 are depicted as sharp interfaces for the purposes of illustration, it should be understood that the transition between the outer portion 404 and the core portion 410, the transition between the inner portion 408 and the core portion 410, and/or the transition from the outer portion 404 and the hardface portion 412 may be gradual and/or graded. The thickness dimensions, as discussed herein are in a radial direction from the channel extending substantially centrally through the bushing 400.

In some example embodiments, $T_T$ may be in the range of about 7 mm to about 20 mm, $T_O$ may be in the range of about 0.5 mm to about 5 mm, $T_C$ may be in the range of about 2 mm to about 12 mm, $T_I$ may be in the range of about 0.5 mm to about 5 mm, and $T_H$ may be in the range of about 30 mm to about 80 mm. In other example embodiments, $T_T$ may be in the range of about 10 mm to about 15 mm, $T_O$ may be in the range of about 1 mm to about 4 mm, $T_C$ may be in the range of about 4 mm to about 9 mm, $T_I$ may be in the range of about 1 mm to about 4 mm, and $T_H$ may be in the range of about 40 mm to about 60 mm. These ranges are examples and according to example embodiments, the ranges may be greater than or less than the amounts discussed here. An example of the dimensions of the total thickness of the bushing $T_T$, the bore hole diameter $T_H$, the outer portion thickness $T_O$, the inner portion thickness $T_I$, and core portion thickness $T_C$ is shown herein in FIG. 5.

In some example embodiments, the ratio of the outer portion thickness to total thickness ($T_O:T_T$) may be in the range of about 1:20 to about 1:3. The ratio of the inner portion thickness to total thickness ($T_I:T_T$) may be in the range of about 1:20 to about 1:3. The ratio of the core portion thickness to total thickness ($T_C:T_T$) may be in the range of about 1:5 to about 2:3. The ratio of the hardface portion thickness to total thickness ($T_{HF}:T_T$) may be in the range of about 1:10 to about 1:3. These ranges are examples and according to example embodiments, the ranges may be greater than or less than the amounts discussed here.

According to example embodiments, the inner portion 408 and the outer portion 404 of the bushing 400 may be substantially martensitic and/or austenitic in crystal structure. The core portion 410, on the other hand may be substantially ferrite and/or pearlite in crystal structure. The inner portion 408 and the outer portion 404 of the bushing 400, as disclosed herein, may be harder than the core portion 410 of the bushing 400. The hardface portion 412 may be substantially martensitic and/or austenitic.

In some example embodiments, the inner portion 408 and the outer portion 404 may have hardness in the range of about 55 HRC to about 64 HRC, the core portion 410 may have hardness in the range of about 39 HRC to about 53 HRC, and the hardface portion 412 may have hardness in the range of about 58 HRC to about 68 HRC. In other example embodiments, the inner portion 408 and the outer portion 404 may have hardness in the range of about 58 HRC to about 62 HRC, the core portion 410 may have hardness in the range of about 40 HRC to about 45 HRC, and the hardface portion 412 may have hardness greater than 55 HRC, such as, for example, in the range of about 60-67 HRC. These ranges are examples and according to example embodiments, the ranges may be greater than or less than the amounts discussed here.

In some example embodiments, the bushing 400 may have an undercut, as defined by edge 414. The undercut may be formed by removing a portion of the steel on the rough bushing. For example, the undercut may be formed prior to other processing, such as prior to carburizing the rough bushing and/or any hardfacing processing. The hardfacing process adds mass and/or volume to the bushing 400. As a result, the undercut, and associated length of the edge 414, may be implemented to achieve an intended thickness of the bushing 400 where the volume added by the hardface portion 412, in combination with the undercut, achieves the intended thickness along the length L of the bushing 400. In other example embodiments, there may be no undercut of the rough bushing prior to other processing. In these embodiments, the volume added by the hardfacing process to the bushing may be engineered such that the final thickness of the bushing 400 is as intended along the length L of the bushing.

The bushing 400 may be manufactured by forming a rough bushing using low carbon steel (e.g., less than 0.4% carbon by weight). Alternatively, medium carbon steel may be used. Rough bushing, as used herein, refers to the formation of the bushing with the low carbon steel starting material, prior to any subsequent thermal treatments, hardening, tempering, carburizing, hardfacing, or the like. Low carbon steel that has ferrite crystal structure may be more easily machined than other materials, such as hardened carbon steel. In some example embodiments, an undercut may be formed in the rough bushing, such as by removing steel from the surface of the rough bushing by any suitable mechanism, such as by using a metal lathe or other metal machining equipment.

The rough bushing may be subject to a carburizing process, such as a thermal diffusion process in a carbon rich environment. This carburizing process may be performed in any suitable furnace, such as an induction furnace or a gas furnace. In some cases, this carburizing process may be a batch process, where more than one rough bushing and/or other components of the machine 100 may be carburized simultaneously. An optional tempering process may be performed, such as after the carburizing process. As a result of the carburizing process, the surfaces of the rough bushing may have a hardened martensitic and/or austenitic crystal structure. The carburizing process may form the inner portion 408 and the outer portion 404 of the bushing 400.

The carburizing process may be a diffusion limited process. For example, the carburizing process may be a Fickian process (e.g., defined by Fick's second law) where the process is substantially self-limiting, rendering the process thermally and/or temporally inefficient beyond the formation of a carbon-rich layer of a certain thickness, such as about 3 mm to about 6 mm. As a result, the self-limiting nature of the carburization process, it may be difficult to form a relatively thick outer portion 404, as may be desired for greater wear resistance and/or reduced galling, by the carburizing process alone.

Additionally, since the carburizing process is a diffusion process (e.g., diffusion of carbon into low carbon and/or alloy steel), the carbon content of the outer portion 404 and/or the inner portion 408 may not be uniform throughout their thickness $T_O$, $T_I$, respectively. For example, carbon concentration may be greatest on the outer surface 402 and progressively lower approaching the interface 416 of the outer portion 404. After carburizing, near the outer surface 402, the carbon concentration may be in the range of about 0.5% to about 1.6% by weight, while near the interface 416, the carbon concentration may be in the range of about 0.20% to about 1% by weight. In some example embodiments, the carbon concentration at the interface 416 may be substantially similar to the carbon concentration of the starting low carbon and/or alloy steel, and/or further, substantially similar to the carbon concentration in the core portion 410. Similar to the outer surface 402, after carburizing, near the inner surface 406, the carbon concentration may be in the range of about 0.5% to about 1.6% by weight, while near the interface 420, the carbon concentration may be in the range of about 0.20% to about 1% by weight. In some example embodiments, the carbon concentration at the interface 420 may be substantially similar to the carbon concentration of the starting low carbon and/or alloy steel, and/or further, substantially similar to the carbon concentration in the core portion 410.

The hardface portion 412 may be formed by welding hardface alloy over a part, or alternatively the entirety, of the outer portion 404. The hardface alloy may be any suitable hardfacing material, such as a high carbide alloy steel. The hardface alloy may include iron concentration greater than about 60% by weight. The hardface alloy may also include chromium (Cr), Manganese (Mn), Nickel (Ni), and/or other materials. Some example hardface alloys may include, but are not limited to, for example, OERLIKON METCO 8224 wire, HOGANS ROCK IT 600 and/or 607 powders, VECALLOY 600, ROCK IT 606, or the like. In other example embodiments, non-steel alloys may be used for hardfacing over the outer portion 404.

The hardface alloy may be in wire or powder form and may be applied to the bushing 400 or other components using any suitable welding mechanism, such as powder laser clad welding, hot wire laser welding, PTA welding, Tungsten Inert Gas (TIG) welding, metal inert gas (MIG) welding, submerged arc welding (SAW), combinations thereof, or the like. In some case, a single pass may be used to deposit the hardface alloy to form the hardface portion 412, and in other cases, multiple passes may be used to deposit the hardface alloy to form the hardface portion 412.

In some example embodiments, the hardface portion 412 may span only a part of the length L of the bushing 204, as shown. In other example embodiments, the hardface portion 412 may span the entirety of the length L of the bushing 204. In some cases, the hardface portion 412 may be formed substantially within an undercut, as defined by edge 414, in the rough bushing, as shown. In other cases, an undercut may not be formed in the rough bushing and the hardface portion 412 may overlie an outer portion 404 that is substantially uniformly disposed in a radial direction of the bushing. In some cases, the hardface portion 412 may have a tapered edge, as shown. In other cases, the hardface portion 412 may not have a tapered edge of may have a different angel of taper that that shown in FIG. 4.

It should be noted that the diffusion limited carburizing process may become prohibitively expensive from a time and/or temperature standpoint beyond a certain carburized critical thickness. The critical thickness may be less than a desired thickness of an outer hardened layer from a wear resistance consideration. At the same time, a highly-stressed thick hardface layer may result in cracking. However, the combination of the two processes may result in a providing a sufficiently thick outer hardened layer, without excessive processing time and/or costs or without a thick hardface that may be prone to cracking.

Although the track bushing 400 is used as a representative component of track chain assembly 160 and/or machine 100, it should be understood that other components, such as such as the drive sprocket 162, the front idler 164, the rear idler 166, the track roller 168, the link 202, shoes of the trach chain assembly, and/or other components of the machine 100, may be manufactured according to the disclosure herein and may have sectional profiles as discussed herein with respect to bushing 400. For example, a drive sprocket may be manufactured such that a hard hardface region may overlie a relatively hard carburized steel layer, that in turn, may overlie a softer low carbon steel region.

Figure 5:
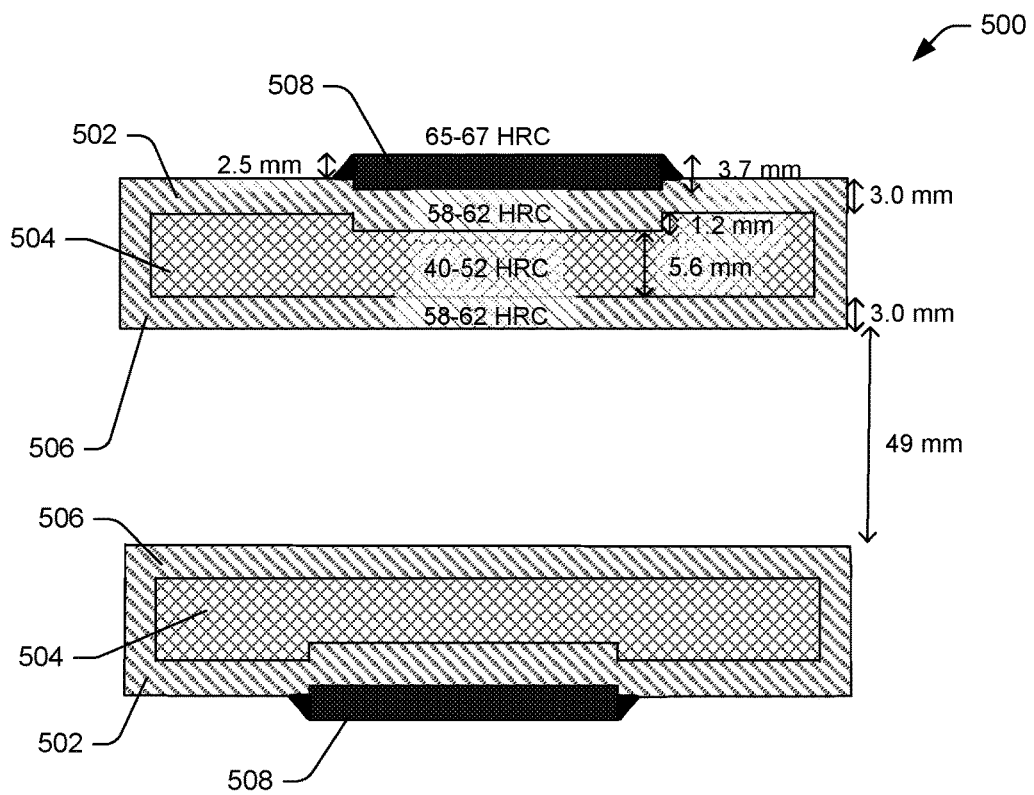
FIG. 5 is another sectional illustration of a particular bushing according to example embodiments of the disclosure.

FIG. 5 is another sectional illustration of a particular bushing 500 according to example embodiments of the disclosure. This bushing 500 cross section may be an illustrative sectioning through the diameter of the track bushing 204, where the exposed face sections of the sectioning is shown, without showing the curved inner surface 302. The dimensions and parameter ranges discussed herein are examples and are not meant to be limiting in any way.

The bushing 500 may have a total thickness of 12.8 mm with a bore hole diameter of 49 mm. The bore hole is the channel extending substantially centrally through the bushing 500, as defined by an inner portion 506 of the bushing 500. The thickness of the bushing 500, measured where the hardface portion is disposed, may be 15.3 mm. The bushing 500 may have an outer portion 502, with a thickness of 3 mm, that spans across an undercut of 1.2 mm in the bushing 500. The inner portion 506 may also have a thickness of 3 mm. Between the inner portion 506 and the outer portion 502 may be disposed a core portion 504, may have a thickness of 6.8 mm where no undercut has been made and a thickness of 5.6 mm underlying the undercut and/or a hardface portion 508. As shown, the core portion may have edges that are also carburized during the carburizing process. The hardface portion 508 may have a thickness of 3.7 mm, of which 2.5 mm extend beyond the outer portion 502. These values are examples and according to example embodiments, the thicknesses may be greater than or less than the amounts discussed here.

In example embodiments, the inner portion 506 and the outer portion 502 may have hardness in the range of about 58 HRC to about 62 HRC and the core portion 504 may have hardness in the range of about 40 HRC to about 52 HRC. The hardface portion 508 may have hardness in the range of about 65 HRC to about 67 HRC. These values are examples and according to example embodiments, the hardness may be greater than or less than the amounts discussed here. The thicknesses of the various regions 502, 506, 508 of bushing 500, as well as their relative ratios, are in the ranges disclosed with reference to bushing 400 of FIG. 4.

Figure 6:
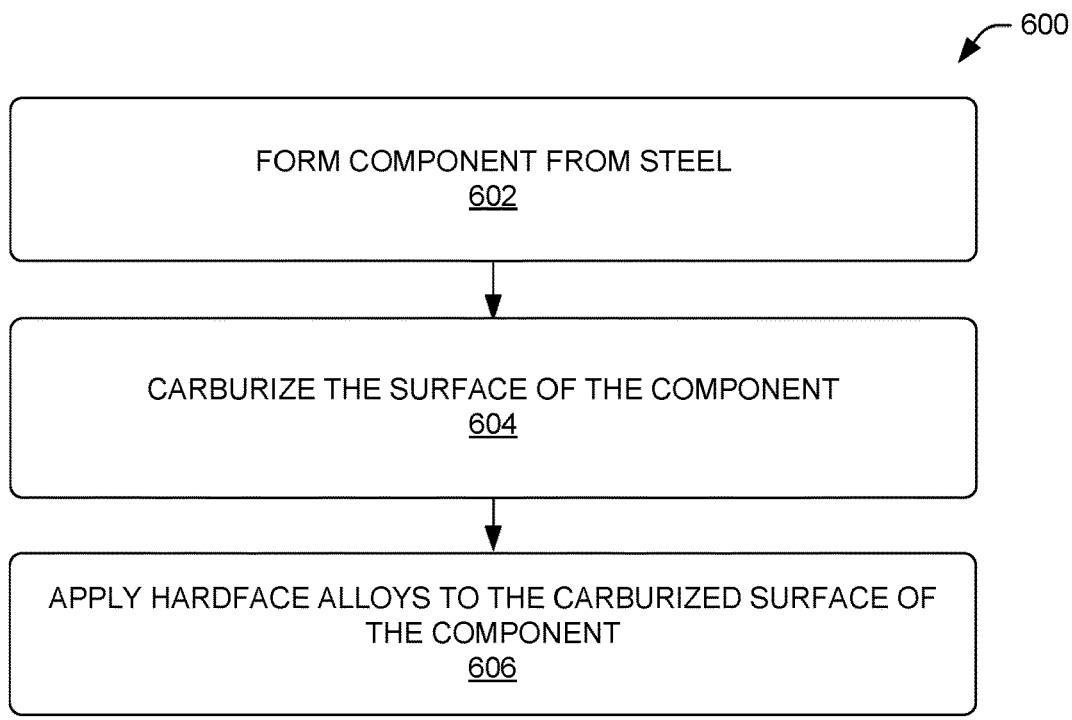
FIG. 6 is a flow diagram depicting an example method for forming an example component of the track chain assembly of FIG. 2, according to example embodiments of the disclosure.

FIG. 6 is a flow diagram depicting an example method for forming an example component of the track chain assembly of FIG. 2, according to example embodiments of the disclosure. The method 600 may be performed using low-carbon steel, medium-carbon steel boron steel, or the like, as discussed herein. In example embodiments, the starting steel may be 10B21 steel, or other similar low carbon steel and/or alloy steel. Alternatively, medium carbon steel may be used.

As discussed herein, the low carbon steel from which the rough components are formed may be in a substantially ferritic crystal structure. The ferritic structure may be soft and ductile, allowing for easier formation of the track bushing 204. In example embodiments, if the starting low carbon steel is not in a ferritic structure, then optionally, a tempering process may be performed prior to commencing the method 600. In example embodiments, the tempering process may be conducted at a particular temperature, such as about 250° C., for a multi-hour anneal. For example, the steel may be held at a temperature range between 150° C. and 600° C. for 1 to 10 hours to temper the steel prior to rough forming the component, such as the track bushing 204. In other cases, the steel may be heated to a range of about 1100° C. to about 1500° C. and cooled slowly to establish a ferritic, cementitic, and/or pearlitic crystal structure.

At block 602, a component may be formed from steel. As discussed above the steel may be a low carbon and/or alloy steel with ferrite crystal structure when forming the component. This form of the low carbon and/or alloy steel is relatively soft and ductile and is, therefore, amenable to machining. Formation of the component, in this case a rough component, may include any variety of machining techniques suitable for forming the component. For example, any type of shaping, turning, milling, drilling, grinding, chiseling, and/or other machining techniques may be used to form the rough component.

At block 604, a surface of the component may be carburized. The carburizing process may involve a diffusion process and/or a cycle of diffusion processes, where the component is held at a diffusion temperature in a carbon rich environment. For example, the component may be held in a furnace at an elevated temperature while flowing carbon containing gases in the furnace.

The furnace process for carburizing the surface may be performed at any suitable temperature and time. For example, the furnace process may be performed at a temperature between about 850° C. and about 1200° C. for a time range of about 3 hours to about 24 hours. In some example embodiments, the furnace process may be performed in a temperature range from about 950° C. to about 1100° C. for a time range of about 14 hours to about 18 hours. After performing the furnace process, in some example embodiments, the rough bushing may be quenched, such as in oil. Alternatively, the quenching process may be in any suitable medium, such as a salt bath, air, and/or water. An optional tempering process may be performed after the carburizing process.

During the furnace process, carbon containing gases may be flowed into the furnace to provide a carbon rich ambient, from which carbon may diffuse into the surface regions of the rough component. For example, liquified petroleum gas (LPG) may be flowed into the furnace at a suitable flow rate to carburize the surface regions of the rough components. Other carbon sources may include, but are not limited to carbon dioxide, carbon monoxide, methane, ethane, propane, butane, pentane, other carbon containing molecules, combinations thereof, or the like.

As discussed herein, the carburizing process may be a diffusion limited process. For example, the carburizing process may be a Fickian process (e.g., defined by Fick's second law) where the process is substantially self-limiting, rendering the process thermally and/or temporally inefficient beyond the formation of a carbon-rich layer of a certain thickness, such as about 3 mm to about 6 mm. As a result, the self-limiting nature of the carburization process, it may be difficult to form a relatively thick casing region on the component being carburized.

It should also be noted that since the carburizing process is a diffusion process (e.g., diffusion of carbon into low carbon and/or alloy steel), the carbon content may diminish away from the surface of the carburized component. For example, carbon concentration may be greatest on the surface of the component and progressively lower farther away from the surface. The carbon concentration at the surface of the component may be in the range of about 0.5% to about 1.6% by weight and may decrease monotonically away from the surface of the component, until the carbon concentration is substantially similar to the bulk carbon concentration of the component. This bulk carbon concentration of the component may be substantially similar to the starting carbon concentration of the low carbon and/or alloy steel.

After the carburizing process, a carbon-rich surface region may be formed on the rough component, such as outer portion 404 and/or inner portion 408, in the case of bushing 400. The carbon-rich surface region may have a hardened martensitic, austenitic, and/or bainite structure. In other words, the rough component, at this point, may have a hardened casing on its surface regions, due to having a relatively higher carbon content near its surfaces. As a result of the carburizing process, the hardness of the surface regions may be in the range of about 55 HRC to about 64 HRC. For example, the surface region may be approximately 60 HRC after the carburizing process. Hardened martensitic carbon-rich steel, while providing high wear resistance and reduced level of galling, is generally brittle and lack ductility. Thus, by limiting the hardened carbon-rich steel as a casing on the surface of the component provides benefits from a wear resistance and galling standpoint, while softer inner portions the component allow for toughness of the component.

At block 606, hardface alloys may be applied to the carburized surface of the component. In some example embodiments, the hardface alloys may be applied to only a part of the carburized surface of the component. An example of this is depicted in FIG. 4, where a part of the length of the bushing 400 has a hardface portion 412 disposed thereon. In other example embodiments, the hardface alloys may be applied to an entirety of the carburized surface of the component.

The hardface alloy may be in wire or powder form and may be applied to the component, such as bushing 400, using any suitable welding mechanism, such as powder laser clad welding, hot wire laser welding, PTA welding, TIG welding, MIG welding, SAW, combinations thereof, or the like. In some case, a single pass may be used to deposit the hardface alloy on the carburized surface, and in other cases, multiple passes may be used to deposit the hardface alloy on the carburized surface.

It should be noted that some of the operations of method 600 may be performed out of the order presented, with additional elements, and/or without some elements. Some of the operations of method 600 may further take place substantially concurrently and, therefore, may conclude in an order different from the order of operations shown above.

Figure 7:
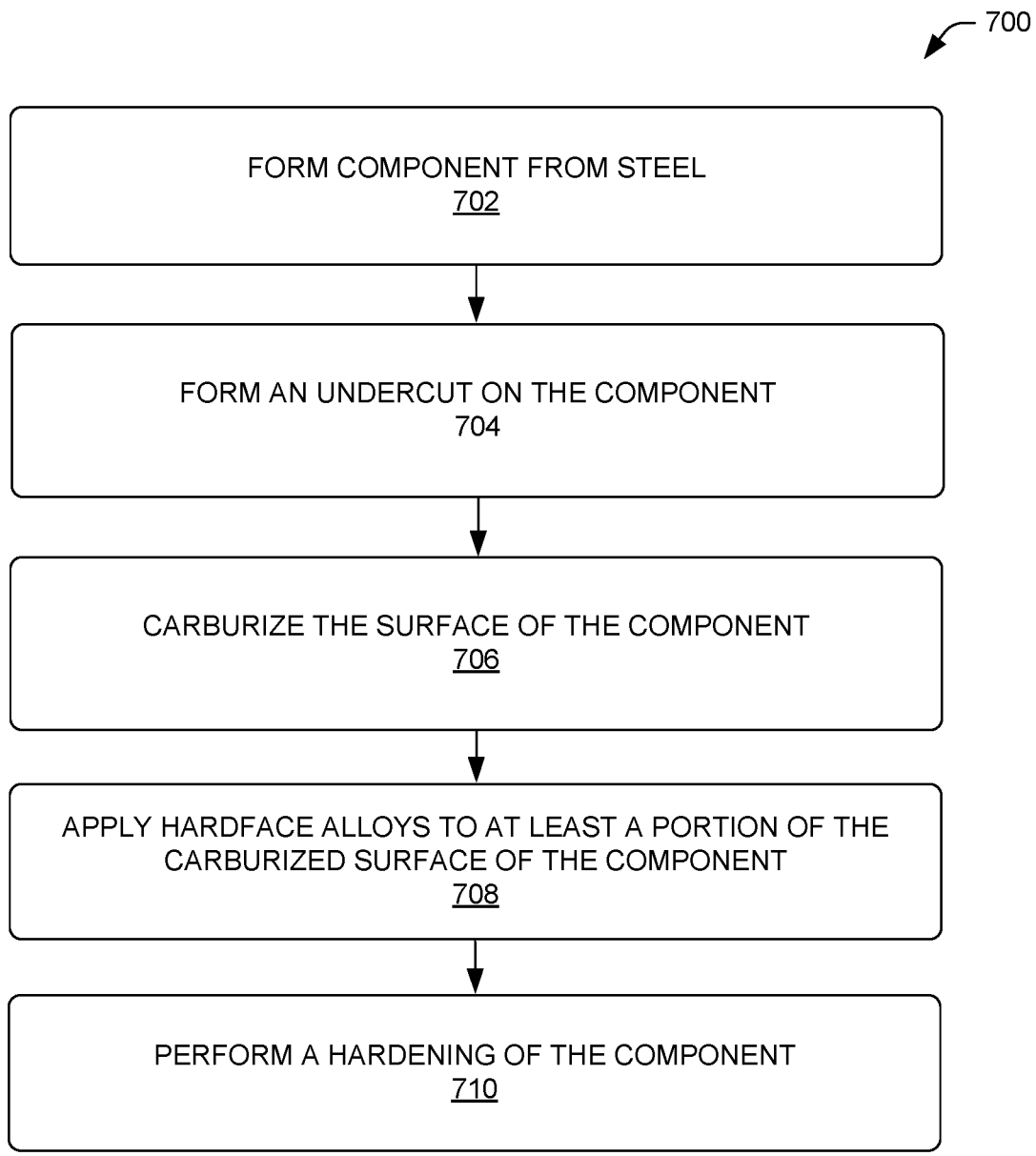
FIG. 7 is a flow diagram depicting another example method for forming an example component of the track chain assembly of FIG. 2, according to example embodiments of the disclosure.

FIG. 7 is a flow diagram depicting another example method for forming an example component of the track chain assembly of FIG. 2, according to example embodiments of the disclosure. The method 700 may be performed using low-carbon steel, medium-carbon steel boron steel, or the like, as discussed herein. In example embodiments, the starting steel may be 10B21 steel, or other similar low carbon steel and/or alloy steel. Alternatively, medium carbon steel may be used.

At block 702, a component may be formed from steel. As discussed above the steel may be a low carbon and/or alloy steel with ferrite crystal structure when forming the component. This form of the low carbon and/or alloy steel is relatively soft and ductile and is, therefore, amenable to machining. Formation of the component, in this case a rough component, may include any variety of machining techniques suitable for forming the component. For example, any type of shaping, turning, milling, drilling, grinding, chiseling, and/or other machining techniques may be used to form the rough component.

At block 704, an undercut may be formed in the component. This may be an optional process. The undercut may be made to accommodate a desired final thickness of the component being manufactured, such as the bushing 400. In some cases, the undercut may be formed in the component by removing steel from the surface of the component by any suitable mechanism, such as by using a metal lathe or other metal machining equipment. In other cases, forming the undercut may be performed substantially at the same time as the processes of block 702. In other words, the rough component may be fabricated with an undercut.

At block 706, the component may be carburized. The carburizing process may involve a diffusion process and/or a cycle of diffusion processes, where the component is held at a diffusion temperature in a carbon rich environment. For example, the component may be held in a furnace at an elevated temperature while flowing carbon containing gases in the furnace, as described herein.

At block 708, hardface alloy may be applied to the at least a portion of the carburized surface of the component. In some example embodiments, the hardface alloys may be applied to only a part of the carburized surface of the component. An example of this is depicted in FIG. 4, where a part of the length of the bushing 400 has a hardface portion 412 disposed thereon. In other example embodiments, the hardface alloys may be applied to an entirety of the carburized surface of the component. In some cases, the hardface alloy may be applied substantially within and/or overlying the undercut formed by the processes of block 704.

The hardface alloy may be in wire or powder form and may be applied to the component, such as bushing 400, using any suitable welding mechanism, such as powder laser clad welding, hot wire laser welding, PTA welding, TIG welding, MIG welding, SAW, combinations thereof, or the like. In some case, a single pass may be used to deposit the hardface alloy on the carburized surface, and in other cases, multiple passes may be used to deposit the hardface alloy on the carburized surface.

At block 710, the component may be hardened. This hardening may be performed in a furnace, such as a gas furnace or an induction furnace. This hardening processing may be performed by heating the component, such as bushing 204, to a higher than eutectic temperature. In some cases, this direct hardening process may be a batch process, where more than one component may be hardened simultaneously.

The furnace process may be performed at any suitable temperature and time. For example, the furnace process may be performed at greater than 800° C. for predetermined time. In some example embodiments, the furnace process may be performed in a temperature range from about 800° C. to about 1000° C. for a time range of about 30 minutes to about 3 hours. For example, the furnace heating process of the hardening may be performed at 850° C. for 60 minutes. After performing the furnace process, the component may be quenched, such as in oil. Alternatively, the quenching process may be in any suitable medium, such as a salt bath, air, and/or water. An optional tempering process may be performed after the hardening process.

After the hardening process, the carburized surface regions of the components may be hardened martensitic, austenitic, and/or bainite structure. As a result of the hardening process, the hardness of the carburized surface regions may be in the range of about 55 HRC to about 64 HRC and the hardfaced regions may be in the range of about 65 HRC to about 67 HRC. The regions of the component farther away from the carburized surfaces and/or the hardfaced regions, where there is a relatively lower level of carbon, may be substantially ferritic and/or pearlitic crystal structure and, therefore, may be relatively softer than carburized regions and/or the hardfaced regions.

It should be noted that some of the operations of method 700 may be performed out of the order presented, with additional elements, and/or without some elements. Some of the operations of method 700 may further take place substantially concurrently and, therefore, may conclude in an order different from the order of operations shown above.

INDUSTRIAL APPLICABILITY

The present disclosure describes systems, structures, and methods to improve wear tolerance and toughness of components, such as components for track-type machines 100. These improved components may include bushings 204 used in track chain assemblies 160 of machines 100. The components, such as the bushings 204, as disclosed herein, may have a hard, wear-resistant surface portions, as well as a soft core portion. The soft core portion provides for a high level of toughness of the components, while the hard surface portions provide for a high level of wear resistance and reduced galling during operation. Although the components, such as the bushings 204, and the procedures to form the components are discussed in the context of track-type machines and undercarriages of those track-type machines, it should be appreciated that the mechanisms to form the same are applicable across a wide array of mechanical systems, such as any mechanical system that can benefit from improved wear resistance of various components.

As a result of the systems, apparatus, and methods described herein, consumable parts of machines, such as bushings may have a greater lifetime. For example, the track bushings 204 described herein may have greater service lifetime than traditional bushings 204 that are not formed by the mechanisms described herein. In some cases, components, such as the bushings 204, may allow for a 25% to 400% improvement in the wear lifetime of consumable parts of track-type machines 100. This reduces field downtime, reduces the frequency of servicing and maintenance, and overall reduces the cost of heavy equipment, such as track-type machines 100. The improved reliability and reduced field-level downtime also improves the user experience such that the machine 100 can be devoted to its intended purpose for longer times and for an overall greater percentage of its lifetime. Improved machine 100 uptime and reduced scheduled maintenance may allow for more efficient deployment of resources (e.g., fewer, but more reliable machines 100 at a construction site). Thus, the technologies disclosed herein improve the efficiency of project resources (e.g., construction resources, mining resources, etc.), provide greater uptime of project resources, and improves the financial performance of project resources.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A method of manufacturing a track chain component, comprising:
    forming an undercut in a rough component of a track chain, thereby forming an undercut region;
    carburizing the rough component of the track chain to form a carburized portion of the track chain component, the rough component formed from a steel having a carbon content less than approximately 0.4% by weight, wherein the steel has a substantially ferrite crystal structure and the carburized portion includes the undercut region; and
    depositing a hardface alloy directly over at least a part of the carburized portion to form a hardface portion of the track chain component, wherein the hardface portion at least partially overlays the undercut region.

2. The method of claim 1, wherein the steel comprises alloy steel including boron.

3. The method of claim 1, wherein the steel comprises a carbon content less than 0.25% by weight.

4. The method of claim 1, wherein carburizing the rough component further comprises:
    heating the rough component to at least 900° C. for a predetermined period of time in a carbon environment; and
    quenching the heated rough component.

5. The method of claim 1, wherein depositing the hardface alloy further comprises at least one of: (i) powder laser clad welding the hardface alloy; (ii) hot wire laser welding the hardface alloy; (iii) Plasma Transfer Arc (PTA) welding the hardface alloy; (iv) Tungsten Inert Gas (TIG) welding the hardface alloy; (v) metal inert gas (MIG) welding; or (vi) submerged arc welding (SAW).

6. The method of claim 1, wherein the track chain component comprises a track bushing and a ratio of a thickness of the hardface portion to a thickness of the track bushing is in a range of 1:10 to 1:3.

7. The method of claim 1, wherein forming the undercut in the track chain component comprises lathing the rough component.

8. The method of claim 1, wherein the carburized portion is harder than a core portion of the track chain component and the hardface portion is harder than the core portion.

9. The method of claim 8, wherein the carburized portion has a hardness of at least 58 HRC and the core portion has a hardness of less than 52 HRC.

10. A bushing, comprising:
    an outer surface and an inner surface opposing the outer surface, the inner surface defining a channel having a substantially constant diameter, the channel extending substantially centrally through the bushing from a first end of the bushing to a second end of the bushing opposite the first end;
    an inner portion including the inner surface;
    an outer portion including the outer surface, the outer portion comprising an undercut region;
    a hardface portion at least partially overlying the outer surface and directly overlying the undercut region; and
    a core portion disposed between the inner portion and the outer portion, wherein:
    the core portion is softer than the inner portion and the outer portion, and
    the core portion is softer than the hardface portion.

11. The bushing of claim 10, wherein:
    the inner portion has a hardness of at least 55 HRC;
    the outer portion has a hardness of at least 55 HRC;
    the hardface portion has a hardness of at least 65; and
    the core portion has a hardness of less than 52 HRC.

12. The bushing of claim 10, wherein the inner portion and the outer portion have a first carbon content greater than a second carbon content of the core portion.

13. The bushing of claim 10, wherein the core portion comprises steel with a carbon content less than 0.25% by weight.

14. The bushing of claim 10, wherein the hardface portion has a ratio of a thickness of the hardface portion to a thickness of the bushing is in a range of 1:10 to 1:3.

15. The bushing of claim 10, wherein the undercut region comprises a carburized region.

16. A track chain assembly comprising a plurality of components including a plurality of track shoes, a plurality of links, and a plurality of bushings, wherein at least one of the components comprises:
    a core portion;
    an undercut region;
    a carburized portion overlying the core portion, the carburized portion including the undercut region; and
    a hardface portion overlying the carburized portion and the undercut region,
    wherein the core portion is softer than the carburized portion, and wherein the carburized portion is softer than the hardface portion, and wherein a combination of the carburized portion and the hardface portion is at least 4 mm in thickness.

17. The track chain assembly of claim 16, wherein the core portion has a substantially ferrite crystal structure.

18. The track chain assembly of claim 16, wherein:
    the carburized portion has a hardness of at least 55 HRC;
    the hardface portion has a hardness of at least 65; and
    the core portion has a hardness of less than 52 HRC.

19. The track chain assembly of claim 16, wherein the hardface portion has a first carbon content that is greater than a second carbon content of the carburized portion and the second carbon content is greater than a third carbon content of the core portion.

20. The track chain assembly of claim 16, wherein the hardface portion comprises a hardface alloy including at least chromium, manganese, and at least 60% by weight of iron.

* * * * *